(12) United States Patent
Ziaylek et al.

(10) Patent No.: US 8,985,933 B2
(45) Date of Patent: Mar. 24, 2015

(54) REMOTE EQUIPMENT STORAGE APPARATUS WITH A DOWNWARDLY EXTENDABLE RETRIEVAL POSITION

(71) Applicant: Michael P. Ziaylek, Yardley, PA (US)

(72) Inventors: Michael P. Ziaylek, Yardley, PA (US); W. Brian McGinty, Huntingdon Valley, PA (US)

(73) Assignee: Michael P. Ziaylek, Yardley, PA (US)

( * ) Notice: Subject to any disclaimer, the term of this patent is extended or adjusted under 35 U.S.C. 154(b) by 130 days.

(21) Appl. No.: 13/986,517

(22) Filed: May 10, 2013

(65) Prior Publication Data

US 2013/0322997 A1 Dec. 5, 2013

Related U.S. Application Data

(60) Provisional application No. 61/689,401, filed on Jun. 5, 2012.

(51) Int. Cl.
| | | |
|---|---|---|
| B62D 43/00 | (2006.01) | |
| B60R 9/06 | (2006.01) | |
| B60R 9/042 | (2006.01) | |
| B60P 3/10 | (2006.01) | |
| A62C 27/00 | (2006.01) | |
| E06C 5/24 | (2006.01) | |
| B60R 9/10 | (2006.01) | |

(52) U.S. Cl.
CPC ............ *B60R 9/0423* (2013.01); *B60P 3/1016* (2013.01); *B60R 9/10* (2013.01); *B60R 9/06* (2013.01); *A62C 27/00* (2013.01); *E06C 5/24* (2013.01); *Y10S 414/13* (2013.01)
USPC ........... 414/462; 414/556; 414/469; 414/917; 182/127; 224/321

(58) Field of Classification Search
USPC ........... 182/127; 224/310, 321, 553; 254/384; 296/3; 414/462, 469, 522, 540, 542, 414/545, 546, 549, 556, 655, 662, 917
See application file for complete search history.

(56) References Cited

U.S. PATENT DOCUMENTS

| | | | |
|---|---|---|---|
| 1,879,304 A | * | 9/1932 | Stuart et al. .................... 414/463 |
| 1,890,940 A | | 12/1932 | Fox |
| 1,898,826 A | | 2/1933 | Fox |
| 1,991,900 A | | 2/1935 | Larsen |
| 2,080,527 A | | 5/1937 | Bixel |
| 2,586,531 A | | 2/1952 | Gordon |
| 2,946,397 A | | 7/1960 | Berberich |
| 3,013,681 A | | 12/1961 | Garnett |
| 3,058,607 A | | 10/1962 | Kiley |
| 3,357,578 A | | 12/1967 | Keonig |
| 3,549,025 A | * | 12/1970 | Messner ........................ 414/282 |
| 3,608,759 A | | 9/1971 | Spurgeon |

(Continued)

*Primary Examiner* — Gregory Adams
(74) *Attorney, Agent, or Firm* — Glenn M. Massina; Fox Rothschild LLP (57) ABSTRACT

An apparatus for facilitating the storage of equipment such as ladders in the upper area, but particularly in the upper area on the outside of emergency vehicles such as trucks which includes a capability of moving the ladder to an extended lower deployed position to facilitate immediate access thereto by emergency workers such as firemen. An outer bracket is connected to an inner housing through a parallel linkage with the inner housing attached to the vehicle and the outer bracket attachable to the equipment. The outer bracket includes a downwardly extendable sliding carriage to facilitate positioning of the equipment at a lower level for aiding in retrieval thereof utilizing a flexible control arm.

20 Claims, 6 Drawing Sheets

(56) References Cited

U.S. PATENT DOCUMENTS

| | | | |
|---|---|---|---|
| 3,627,158 A | 12/1971 | Kobasic | |
| 3,637,097 A | 1/1972 | Horowitz | |
| 3,715,044 A | 2/1973 | Simons | |
| 3,717,271 A | 2/1973 | Bargman, Jr. | |
| 3,720,334 A | 3/1973 | Permut et al. | |
| 3,823,839 A | 7/1974 | Petzing et al. | |
| 3,826,386 A * | 7/1974 | Tauer | 414/546 |
| 3,877,624 A | 4/1975 | Carson | |
| 3,963,136 A | 6/1976 | Spanke | |
| 4,008,838 A | 2/1977 | Correll | |
| 4,021,070 A * | 5/1977 | Shea | 296/19 |
| 4,062,464 A | 12/1977 | Grove | |
| 4,134,509 A | 1/1979 | Clement | |
| 4,161,997 A | 7/1979 | Norman | |
| 4,170,331 A | 10/1979 | Faulstich | |
| 4,236,860 A | 12/1980 | Gottlieb et al. | |
| 4,239,438 A | 12/1980 | Everson | |
| 4,260,314 A * | 4/1981 | Golze | 414/462 |
| 4,262,834 A | 4/1981 | Nutt | |
| 4,339,064 A | 7/1982 | Ziaylek, Jr. | |
| 4,339,223 A | 7/1982 | Golze | |
| 4,376,611 A | 3/1983 | Koop | |
| 4,390,117 A | 6/1983 | Fagan | |
| 4,439,086 A | 3/1984 | Thede | |
| 4,618,083 A | 10/1986 | Weger, Jr. | |
| 4,751,981 A | 6/1988 | Mitchell et al. | |
| 4,808,056 A | 2/1989 | Oshima | |
| 4,813,585 A | 3/1989 | Nutt | |
| 4,826,387 A | 5/1989 | Audet | |
| 4,827,742 A | 5/1989 | McDonald | |
| 4,844,490 A | 7/1989 | Kohler | |
| 4,858,725 A | 8/1989 | Griffin | |
| 4,877,108 A | 10/1989 | Griffin et al. | |
| 4,887,750 A | 12/1989 | Dainty | |
| 4,909,352 A | 3/1990 | McComb | |
| 4,923,103 A | 5/1990 | Sauber | |
| 4,953,757 A | 9/1990 | Stevens et al. | |
| 5,009,350 A | 4/1991 | Schill et al. | |
| 5,048,641 A | 9/1991 | Holcomb et al. | |
| 5,058,791 A | 10/1991 | Henriquez et al. | |
| 5,104,280 A | 4/1992 | Ziaylek et al. | |
| 5,154,563 A | 10/1992 | Phillips | |
| D331,030 S | 11/1992 | Ziaylek et al. | |
| 5,172,952 A | 12/1992 | Lasnetski | |
| 5,174,411 A | 12/1992 | Oliver et al. | |
| 5,209,628 A | 5/1993 | Hassell | |
| 5,242,094 A | 9/1993 | Finley | |
| 5,255,757 A | 10/1993 | Horowitz et al. | |
| 5,297,912 A | 3/1994 | Levi | |
| 5,346,357 A | 9/1994 | Hassell | |
| 5,360,150 A | 11/1994 | Praz | |
| 5,398,778 A | 3/1995 | Sexton | |
| 5,405,234 A | 4/1995 | Ziaylek, Jr. et al. | |
| 5,421,495 A | 6/1995 | Bubik et al. | |
| 5,469,933 A | 11/1995 | Thomason | |
| 5,518,357 A | 5/1996 | Ziaylek, Jr. et al. | |
| 5,544,998 A * | 8/1996 | Malinowski | 414/522 |
| 5,632,591 A | 5/1997 | Henriquez | |
| 5,709,521 A | 1/1998 | Glass et al. | |
| 5,791,857 A | 8/1998 | Ziaylek, Jr. et al. | |
| 5,850,891 A | 12/1998 | Olms et al. | |
| 6,003,633 A | 12/1999 | Rolson | |
| 6,019,567 A * | 2/2000 | Lutkus et al. | 414/549 |
| 6,086,312 A | 7/2000 | Ziaylek et al. | |
| 6,092,972 A | 7/2000 | Levi | |
| 6,099,231 A | 8/2000 | Levi | |
| 6,179,543 B1 | 1/2001 | Adame et al. | |
| 6,257,534 B1 | 7/2001 | Finley | |
| 6,273,668 B1 | 8/2001 | Kameda | |
| 6,315,181 B1 | 11/2001 | Bradley et al. | |
| 6,321,873 B1 | 11/2001 | LaBrash | |
| 6,340,060 B1 | 1/2002 | Larson et al. | |
| 6,360,930 B1 | 3/2002 | Flickenger | |
| 6,378,654 B1 | 4/2002 | Ziaylek, Jr. et al. | |
| 6,427,889 B1 | 8/2002 | Levi | |
| 6,561,396 B2 | 5/2003 | Ketterhagen | |
| 6,578,666 B1 | 6/2003 | Miller | |
| D487,049 S | 2/2004 | Ziaylek et al. | |
| 6,764,268 B2 | 7/2004 | Levi | |
| 6,827,541 B1 | 12/2004 | Ziaylek et al. | |
| 6,854,627 B2 | 2/2005 | Foo et al. | |
| 6,874,835 B1 | 4/2005 | Silverness | |
| 6,929,162 B1 | 8/2005 | Jordan | |
| 6,973,996 B2 | 12/2005 | Huff | |
| D519,074 S | 4/2006 | McAnally | |
| 7,097,409 B2 | 8/2006 | Richter | |
| 7,137,479 B2 | 11/2006 | Ziaylek et al. | |
| 7,165,650 B2 | 1/2007 | Korchagin et al. | |
| 7,210,559 B2 | 5/2007 | Hickey | |
| 7,210,721 B1 | 5/2007 | Bell | |
| D545,263 S | 6/2007 | Ziaylek et al. | |
| 7,232,285 B1 * | 6/2007 | Ruch | 414/542 |
| 7,341,418 B2 | 3/2008 | Ito | |
| 7,351,027 B2 * | 4/2008 | Ruch | 414/540 |
| D570,765 S | 6/2008 | Trusty et al. | |
| D571,279 S | 6/2008 | Trusty et al. | |
| 7,422,263 B2 | 9/2008 | Pritchard | |
| D585,011 S | 1/2009 | Ziaiylek | |
| 7,476,071 B2 * | 1/2009 | Ito | 414/466 |
| 7,549,831 B2 | 6/2009 | Hendley et al. | |
| 7,758,091 B1 | 7/2010 | McCall | |
| 7,780,050 B2 * | 8/2010 | Tucker | 224/310 |
| 7,992,682 B2 | 8/2011 | Ziaylek | |
| 2005/0238471 A1* | 10/2005 | Ablabutyan et al. | 414/546 |
| 2008/0085176 A1 | 4/2008 | Statkus | |
| 2009/0159368 A1 | 6/2009 | Ziaylek | 182/127 |
| 2011/0250041 A1* | 10/2011 | Wissler et al. | 414/546 |

* cited by examiner

REMOTE EQUIPMENT STORAGE APPARATUS WITH A DOWNWARDLY EXTENDABLE RETRIEVAL POSITION

The present utility application hereby formally claims priority of U.S. Provisional Patent application No. 61/689,401 filed Jun. 5, 2012 entitled "REMOTE CONTROL STORAGE APPARATUS WITH DOWNWARDLY EXTENDABLE RETRIEVAL POSITION PARTICULARLY USABLE WITH AN EMERGENCY VEHICLE" filed by the same inventor listed herein, namely, Michael P. Ziaylek and W. Brian McGinty, and assigned to the same assignee, namely, Michael P. Ziaylek, said referenced provisional application being hereby formally incorporated by reference as an integral part of the present application.

BACKGROUND OF THE INVENTION

1. Field of the Invention

The construction shown in the present invention applies to the field of devices wherein emergency equipment such as ladders or the like are required to be stored at a relatively high position adjacent the external structure of a vehicle such as an emergency vehicle like a fire truck in such a manner as to be convenient for storage when the vehicle is traveling and available for deployment at the emergency location. The construction must include a means for deploying the ladder or other emergency equipment to a lowered deployed position which provides immediate access thereto for emergency workers. Such devices are often utilized on fire trucks, ambulances or other similar emergency vehicles. These devices need to provide the capability for usage with various different sizes and configurations of ladders while also providing a full mechanism for powering movement for storing and deploying rapidly when needed.

2. Description of the Prior Art

Many patents have been issued for the purpose of positioning and re-positioning of emergency storage equipment and ladders relative to vehicles such as shown in U.S. Pat. No. 1,890,940 patented Dec. 13, 1932 to C. H. Fox and assigned to Ahrens-Fox Fire Engine Company on a "Fire Engine"; and U.S. Pat. No. 1,898,826 patented Feb. 21, 1933 to C. H. Fox and assigned to Ahrens-Fox Fire Engine Company on a "Fire Engine"; and U.S. Pat. No. 1,991,900 patented Feb. 19, 1935 to N. P. Larsen and assigned to The American Coach and Body Company on a "Ladder Support"; and U.S. Pat. No. 2,080,527 patented May 18, 1937 to E. C. Bixel and assigned to American Telephone and Telegraph Company on a "Ladder Holder"; and U.S. Pat. No. 2,586,531 patented Feb. 19, 1952 to D. L. Gordon on a "Wheeled Support Having Ladder Assembly"; and U.S. Pat. No. 2,946,397 patented Jul. 26, 1960 to W. A. Berberich on a "Ladder Mount For Vehicles"; and U.S. Pat. No. 3,013,681 patented Dec. 19, 1961 to E. V. Garnett on a "Device For Storage Of Elongated Articles On A Vehicle"; and U.S. Pat. No. 3,058,607 patented Oct. 16, 1962 to J. T. Kiley and assigned to James A. Kiley Company on "Ladder Racks"; and U.S. Pat. No. 3,357,578 patented Dec. 12, 1967 to J. O. Koenig on a "Boat Carrier For Pickup Mounted Camper Coaches"; and U.S. Pat. No. 3,608,759 patented Sep. 28, 1971 to L. A. Spurgeon et al on a "Car Top Carrier"; and U.S. Pat. No. 3,627,158 patented to F. Kobasic on Dec. 14, 1971 on a "Loader For Vehicle Trunk Compartment"; and U.S. Pat. No. 3,637,097 patented Jan. 25, 1972 to R. R. Horowitz and assigned to S & H Industries, Inc. on a "Power-Operated Tailgate With Maximum Rearward Displacement Between Fully Elevated And Fully Lowered Positions"; and U.S. Pat. No. 3,715,044 patented Feb. 6, 1973 to G. A. Simons on a "Roof Mounted Carrier For Automotive Vehicles"; and U.S. Pat. No. 3,717,271 patented Feb. 20, 1973 to D. L. Bargman, Jr. and assigned to Colorado Leisure Products, Inc. on a "Vehicle Tire Carrier"; and U.S. Pat. No. 3,720,334 patented Mar. 13, 1973 to A. A. Permut et al on "Boat And Equipment Loading Systems"; and U.S. Pat. No. 3,823,839 patented Jul. 16, 1974 to R. C. Petzing et al on a "Cartop Carrier Elevator"; and U.S. Pat. No. 3,877,624 patented Apr. 15, 1975 to M. T. Carson on a "Vehicle Top Rack"; and U.S. Pat. No. 3,963,136 patented Jun. 15, 1976 to T. J. Spanke on a "Retractable Ladder Rack"; and U.S. Pat. No. 4,008,838 patented Feb. 22, 1977 to R. R. Correll on a "Ladder Rack"; and U.S. Pat. No. 4,062,464 patented Dec. 13, 1977 to R. E. Grove on "Mounting Brackets For An Article Handling Apparatus"; and U.S. Pat. No. 4,134,509 patented Jan. 16, 1979 to C. H. Clement on a "Vehicle Top Loader Mechanism"; and U.S. Pat. No. 4,161,997 patented Jul. 24, 1979 to T. W. Norman on a "Self-Storing Step Structure For Vehicular Mounting"; and U.S. Pat. No. 4,170,331 patented to E. W. Faulstich on Oct. 9, 1979 on a "Vehicle Ladder Rack"; and U.S. Pat. No. 4,236,860 patented Dec. 2, 1980 to D. Gottlieb et al on an "Apparatus For Lifting A Wheelchair Onto The Roof Of An Automobile"; and U.S. Pat. No. 4,239,438 patented Dec. 16, 1980 to C. R. Everson on a "Device For Lifting and Carrying Loads On Top Of Pickup Trucks"; and U.S. Pat. No. 4,262,834 patented Apr. 21, 1981 to W. H. Nutt and assigned to Teledyne Canada, Limited on a "Ladder Rack"; and U.S. Pat. No. 4,339,064 patented Jul. 13, 1982 to T. Ziaylek, Jr. on a "Carrier Clamp For Fire Ladders"; and U.S. Pat. No. 4,339,223 patented Jul. 13, 1982 to R. R. Golze on a "Roof Top Carrier"; and U.S. Pat. No. 4,376,611 patented Mar. 15, 1983 to B. H. Koop on a "Car Top Carrier For Wheelchair"; and U.S. Pat. No. 4,390,117 patented Jun. 28, 1983 to M. W. Fagan on a "Ladder Rack For Vehicle"; and U.S. Pat. No. 4,439,086 patented Mar. 27, 1984 to R. W. Thede on a "Boat Loader"; and U.S. Pat. No. 4,618,083 patented Oct. 21, 1986 to K. F. Weger, Jr. and assigned to Knaack Mfg. Co. on a "Ladder Clamping Device For Vehicle Rack"; and U.S. Pat. No. 4,751,981 patented Jun. 21, 1988 to J. C. Mitchell et al on a "Detachably Mounted Ladder Rack"; and U.S. Pat. No. 4,808,056 patented Feb. 28, 1989 to S. Oshima on an "Elevator Device Transportable In A Motor Vehicle"; and U.S. Pat. No. 4,813,585 patented Mar. 21, 1989 to W. H. Nutt and assigned to Teledyne Canada Limited on a "Ladder Rack"; and U.S. Pat. No. 4,826,387 patented May 2, 1989 to M. Audet on a "Vehicle Roof Rack"; and U.S. Pat. No. 4,827,742 patented May 9, 1989 to R. R. McDonald and assigned to Unistrut Australia Pty. Ltd. on a "Security Assembly For Vehicle Roofrack"; and U.S. Pat. No. 4,844,490 patented Jul. 4, 1989 to R. E. Kohler on a "Fire Truck Ladder Support"; and U.S. Pat. No. 4,858,725 patented Aug. 22, 1989 to L. H. Griffin on a "Ladder Brace"; and U.S. Pat. No. 4,877,108 patented Oct. 31, 1989 to L. H. Griffin et al on a "Hydraulic Ladder Brace"; and U.S. Pat. No. 4,887,750 patented Dec. 19, 1989 to R. K. Dainty and assigned to British Gas plc on a "Rack Arrangement"; and U.S. Pat. No. 4,909,352 patented Mar. 20, 1990 to K. McComb on a "Ladder Support System"; and U.S. Pat. No. 4,923,103 patented May 8, 1990 to C. J. Sauber on a "Ladder Rack"; and U.S. Pat. No. 4,953,757 patented Sep. 4, 1990 to J. R. Stevens et al on a "Front Rack For A Truck"; and U.S. Pat. No. 5,009,350 patented Apr. 23, 1991 to J. M. Schill et al on "Retainer Assemblies For Elongated Objects"; and U.S. Pat. No. 5,048,641 patented to J. N. Holcomb et al and assigned to Jack N. Holcomb on Sep. 17, 1991 on a "Van-Mounted Ladder Assembly With Concealed Radio Antennas"; and U.S. Pat. No. 5,058,791 patented Oct. 22, 1991 to K. R. Henriquez et al and assigned to Slide-Out Inc. on a "Vehicular Ladder Rack"; and U.S. Pat. No. 5,104,280 patented Apr. 14, 1992 to M. P. Ziaylek et al and assigned to Michael P. Ziaylek on an "Apparatus For Use With An Emergency Vehicle For Storage And Retrieval Of Remotely Located Emergency Devices"; and U.S. Pat. No. 5,154,563 patented Oct. 13, 1992 to J. R. Phillips on a "Wheel Chair Carrier"; and U.S. Pat. No. 5,172,952 patented to R. Lasnegski on Dec. 22, 1992 on an "Overhead Storage Rack For Storing Ladders Or The Like"; and U.S. Pat. No. 5,174,411 patented Dec. 29, 1992 to D. P. Oliver et al and assigned to Abru Aluminum Limited on "Ladder Improvements"; and U.S. Pat. No. 5,209,628 patented May 11, 1993 to C. C. Hassell on a "Self-Loading Dolly Mount Apparatus"; and U.S. Pat. No. 5,242,094 patented Sep. 7, 1993 to A. L. Finley on a "Ladder Rack"; and U.S. Pat. No. 5,255,757 patented Oct. 26, 1993 to M. Horowitz et al and assigned to Martin Horowitz on a "Collapsible Ladder"; and U.S. Pat. No. 5,297,912 patented Mar. 29, 1994 to A. Y. Levi and assigned to JAJ Products, Inc. on a "Ladder Rack For Motor Vehicles"; and U.S. Pat. No. 5,346,357 patented Sep. 13, 1994 to C. C. Hassell on a "Self-Locking Parallel-Motion Dolly Mount"; and U.S. Pat. No. 5,360,150 patented Nov. 1, 1994 to J. L. Praz on a "Roof Rack For Vehicles"; and U.S. Pat. No. 5,5,398,778 patented Mar. 21, 1995 to R. Sexton on a "Ladder Rack Securing And Release System"; and U.S. Pat. No. 5,405,234 patented Apr. 11, 1995 to T. Ziaylek, Jr. et al on a "Pivotable Article Retaining Apparatus To Invert And Store A Collapsible Water Storage Tank On A Vehicle"; and U.S. Pat. No. 5,421,495 patented Jun. 6, 1995 to L. Bubik et al and assigned to Innovative Bicycle Design Inc. on a "Vehicle Roof Rack"; and U.S. Pat. No. 5,469,933 patented Nov. 28, 1995 to J. Thomason on a "Vehicle Mounted Ladder"; and U.S. Pat. No. 5,518,357 patented May 21, 1996 to T. Ziaylek, Jr. et al and assigned to Theodore Ziaylek, Jr. and Michael P. Ziaylek on a "Retaining And Retrieval Apparatus For Storage Of A Ladder Upon A Vehicle Shelf Area"; and U.S. Pat. No. 5,632,591 patented May 27, 1997 to K. R. Henriquez on a "Ladder Storage And Transport Device"; and U.S. Pat. No. 5,709,521 patented Jan. 20, 1998 to D. Glass et al on a "Lift Assembly Bicycle Carrier For Car Rooftop"; and U.S. Pat. No. 5,791,857 patented Aug. 11, 1998 to T. Ziaylek, Jr. et al and assigned to Theodore Ziaylek, Jr. and Michael Paul Ziaylek on an "Automatic Ladder Lowering And Storage Device For Use With An Emergency Vehicle"; and U.S. Pat. No. 5,850,891 patented Dec. 22, 1998 to J. J. Olms et al and assigned to Trimble Navigation Limited on a "Motorized Rack System"; and U.S. Pat. No. 6,003,633 patented Dec. 21, 1999 to R. G. Rolson and assigned to Robert G. Rolson on a "Portable Truck Or Trailer Ladder Assembly"; and U.S. Pat. No. 6,086,312 patented Jul. 11, 2000 to M. P. Ziaylek et al on a "Tank Handling Apparatus"; and U.S. Pat. No. 6,092,972 patented Jul. 25, 2000 to A. Y. Levi on a "Truck Mounted Ladder Rack"; and U.S. Pat. No. 6,099,231 patented Aug. 8, 2000 to A. Y. Levi on a "Drive Unit For Motor Vehicle Ladder Rack"; and U.S. Pat. No. 6,179,543 patented Jan. 30, 2001 to D. Adame et al on a "Rack For Motor Vehicles"; and U.S. Pat. No. 6,257,534 patented Jul. 10, 2001 to A. L. Finley and assigned to Finley Body Industries Inc. on a "Ladder Rack Assembly"; and U.S. Pat. No. 6,273,668 patented Aug. 14, 2001 to F. Kameda and assigned to Nissin Jidosha Kogyo Co., Ltd. on a "Wheel Chair Storage Apparatus Of Car"; and U.S. Pat. No. 6,315,181 patented Nov. 13, 2001 to J. A. Bradley et al and assigned to Adrian Steel Company on a "Ladder Rack Apparatus And Method"; and U.S. Pat. No. 6,321,873 patented Nov. 27, 2001 to R. LaBrash and assigned to Tra-Lor-Mate, Inc. on a "Ladder Mounting System"; and U.S. Pat. No. 6,340,060 patented Jan. 23, 2002 to L. G. Larsson et al and assigned to Cold Cut Systems Svenska A. B. on a "Method And Equipment For Use In Rescue Service"; and U.S. Pat. No. 6,360,930 patented Mar. 26, 2002 to M. Flickenger and assigned to L & P Property Management Company on a "Vehicle Rack Assembly With Hydraulic Assist"; and U.S. Pat. No. 6,378,654 patented Apr. 30, 2002 to T. Ziaylek, Jr. et al on a "Ladder Pivotally Attached To A Generally Vertically Extending Surface"; and U.S. Pat. No. 6,427,889 patented Aug. 6, 2002 to A. Y. Levi on a "Ladder Rack For Hi Bay Vans"; and U.S. Pat. No. 6,561,396 patented May 13, 2003 to C. A. Ketterhagen and assigned to Johnson Outdoors Inc. on an "Automobile Cargo Carrier System"; and U.S. Pat. No. 6,578,666 patented Jun. 17, 2003 to R. K. Miller on a "Portable Safety Ladder Assembly For A Truck Trailer"; and U.S. Pat. No. 6,764,268 patented Jul. 20, 2004 to A. Y. Levi on a "Ladder Rack Assembly"; and U.S. Pat. No. 6,827,541 patented Dec. 7, 2004 to M. P. Ziaylek et al on an "Apparatus For Holding Elongated Objects Horizontally Adjacent To A Vehicular Body Which Is Movable Between An Upper Storage Position And A Lower Access Position"; and U.S. Pat. No. 6,854,627 patented Feb. 15, 2005 to B. Foo et al and assigned to eRack LLC on a "Vehicle Utility Rack"; and U.S. Pat. No. 6,874,835 patented Apr. 5, 2005 to L. A. Silverness on a "Collapsible Rack For Storing Ladders And The Like On A Land Vehicle"; and U.S. Pat. No. 6,929,162 patented Aug. 16, 2005 to L. R. Jordan on an "Automatic Locking Ladder Rack"; and U.S. Pat. No. 6,973,996 patented Dec. 13, 2005 to F. J. Huff on a "Ladder Mounting Apparatus And Method Of Use"; and U.S. Pat. No. 7,097,409 patented Aug. 29, 2006 to T. S. Richter and assigned to Adrian Steel Co. on a "Ladder Rack System"; and U.S. Pat. No. 7,137,479 patented Nov. 21, 2006 to M. P. Ziaylek et al and assigned to Michel P. Ziaylek, Theodore Ziaylek, Jr. and Theodore P. Ziaylek on a "Powered Ladder Storage Apparatus For An Emergency Vehicle"; and U.S. Pat. No. 7,165,650 patented Jan. 23, 2007 to P. V. Korchagin et al on a "High-Rise, Fire-Fighting, Rescue And Construction Equipment"; and U.S. Pat. No. 7,210,559 patented May 1, 2007 to D. R. Hickey and assigned to Cross Tread Industries, Inc. on an "Apparatus And Method For Holding/Locking A Ladder Or Other Object To A Structure"; and U.S. Pat. No. 7,210,721 patented May 1, 2007 to W. C. Bell on a "Side Mounted Ladder Rack For Pick-Up Truck"; and U.S. Pat. No. 7,341,418 patented Mar. 11, 2008 to H. Ito and assigned to Sato Kogyosyo Co., Ltd. on a "Vehicle Equipped With Lift Device And Lift Device"; and U.S. Pat. No. 7,422,263 patented Sep. 9, 2008 to W. H. Pritchard on a "Ladder Assembly For A Tailgate Of A Truck"; and U.S. Pat. No. 7,549,831 patented Jun. 23, 2009 to J. H. Hendley et al and assigned to L & P Property Management Company on a "Ladder Rack Apparatus And Method"; and U.S. Pat. No. 7,758,091 patented Jul. 20, 2010 to D. A. McCall on a "Collapsible Ladder Rack System For Vehicles"; and U.S. Pat. No. 7,992,682 patented Aug. 9, 2011 to M. P. Ziaylek on a "Ladder Storing Apparatus For Use With An Emergency Vehicle"; and U.S. Publication No. 2008/0085176 published Apr. 10, 2008 to S.C. Statkus on a "Vehicle Accessory Hoist"; and U.S. Design Pat. No. D331,030 patented Nov. 17, 1992 to M. P. Ziaylek et al and assigned to Michael P. Ziaylek on a "Unit For Use With An Emergency Vehicle For Storage And Retrieval Of Remotely Located Emergency Devices"; and U.S. Design Pat. No. D487,049 patented to T. Ziaylek, Jr. et al on Feb. 24, 2004 on an "Apparatus For Retaining Elongated Objects Relative To A Vehicular Body And Providing Access Thereto"; and U.S. Design Pat. No. D519,074 patented Apr. 18, 2006 to D. K. McAnally on an "Auxiliary Bumper-Mounted Rack For Recreational Vehicles"; and U.S. Design Pat. No. D545,263 patented Jun. 26, 2007 to M. P. Ziaylek et al and assigned to Michael P. Ziaylek, Theodore Ziaylek, Jr. and Theodore P. Ziaylek on a "Powered Ladder Storage Apparatus For Use With A Vehicle"; and U.S. Design Pat. No. D570,765 patented Jun. 10, 2008 to J. Trusty et al on a "Sliding Ladder And Equipment Rack"; and U.S. Design Pat. No. D571,279 patented Jun. 17, 2008 to J. Trusty et al on a "Sliding Ladder And Equipment Rack"; and U.S. Design Pat. No. D585,011 patented Jan. 29, 2009 to M. P. Ziaylek on a "Ladder Storing Apparatus For Use With An Emergency Vehicle".

SUMMARY OF THE INVENTION

The present invention discloses a remote equipment storage apparatus with a downwardly extendable retrieval position which is particularly usable for storing equipment on an emergency vehicle which includes an inner housing mounted to an emergency vehicle, and a parallel arm assembly pivotally movably attached thereto. This parallel arm assembly is movable between a storage or remote position adjacent to the inner housing, and a deployed or downwardly extending position extending downwardly therefrom to a position spatially disposed from the inner housing.

An outer bracket is included pivotally movably attached to the parallel arm assembly at a position spatially disposed from the inner housing. The outer bracket is movable along with the parallel arm assembly between a storage position adjacent the inner housing, and a deployed position spatially disposed therefrom. The apparatus further includes a first slide bar member secured to the outer bracket and extending outwardly therefrom, and a second bar member secured to said outer bracket and extending outwardly therefrom at a position spatially disposed from the first slide bar member. A sliding carriage is included movably engaged with respect to the first slide bar member and the second slide bar member. This sliding carriage preferably includes a front panel adapted to receive equipment attached with respect thereto to facilitate movement thereof between the storage position and the deployed position. The sliding carriage further includes a first side panel extending outwardly from the front panel. A second side panel is also included extending outwardly from the front panel at a position spatially disposed from the first side panel. The front panel and the first side panel and the second side panel together will define therebetween a slide chamber adapted to receive the first slide bar member and the second slide bar member slidably movably retained therewithin to facilitate vertical movement of the sliding carriage along the first and second slide bar members during movement to and from a deployed position therebelow to facilitate access to equipment attached to the front panel of the sliding carriage.

A longitudinally extensible member is included attached to the inner housing and to the parallel arm assembly to power movement thereof between the storage position and the deployed position. A flexible control line is also included attached to the inner housing which extends through the parallel arm assembly and preferably around a pulley secured thereto, and is furthermore attached to the sliding carriage to limit downward movement thereof to the deployed position.

It is an object of the remote equipment storage apparatus for use storing emergency equipment such as ladders on an emergency vehicle of the present invention to provide a construction where adjustment and positioning of the deployed position relative to the storage position is possible.

It is an object of the remote equipment storage apparatus for use with an emergency vehicle of the present invention to provide a construction wherein any type of a latching mechanism relative to an outer sliding carriage is made possible.

It is an object of the remote equipment storage apparatus for use with an emergency vehicle of the present invention to provide a construction where a ladder can move from an upper to a lower position conveniently and easily in an emergency situation such as by a fire truck at a fire.

It is an object of the remote equipment storage apparatus for use with an emergency vehicle of the present invention to provide a construction where the equipment can be maintained horizontally at any point over the external surface of an emergency vehicle for storage and are also capable of movement downwardly to a deployed position.

It is an object of the remote equipment storage apparatus for use with an emergency vehicle of the present invention to provide movement of a ladder or other emergency equipment between a storage on top of a vehicle and a deployed position extending downwardly and rearwardly at a position downwardly located therefrom.

It is an object of the remote equipment storage apparatus for use with an emergency vehicle of the present invention to provide an extended lower position by including a downwardly slidable sliding carriage to which the ladder or other emergency equipment can be secured which provides an enhanced lowered position to facilitate immediate access thereto under emergency conditions such as at a fire.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
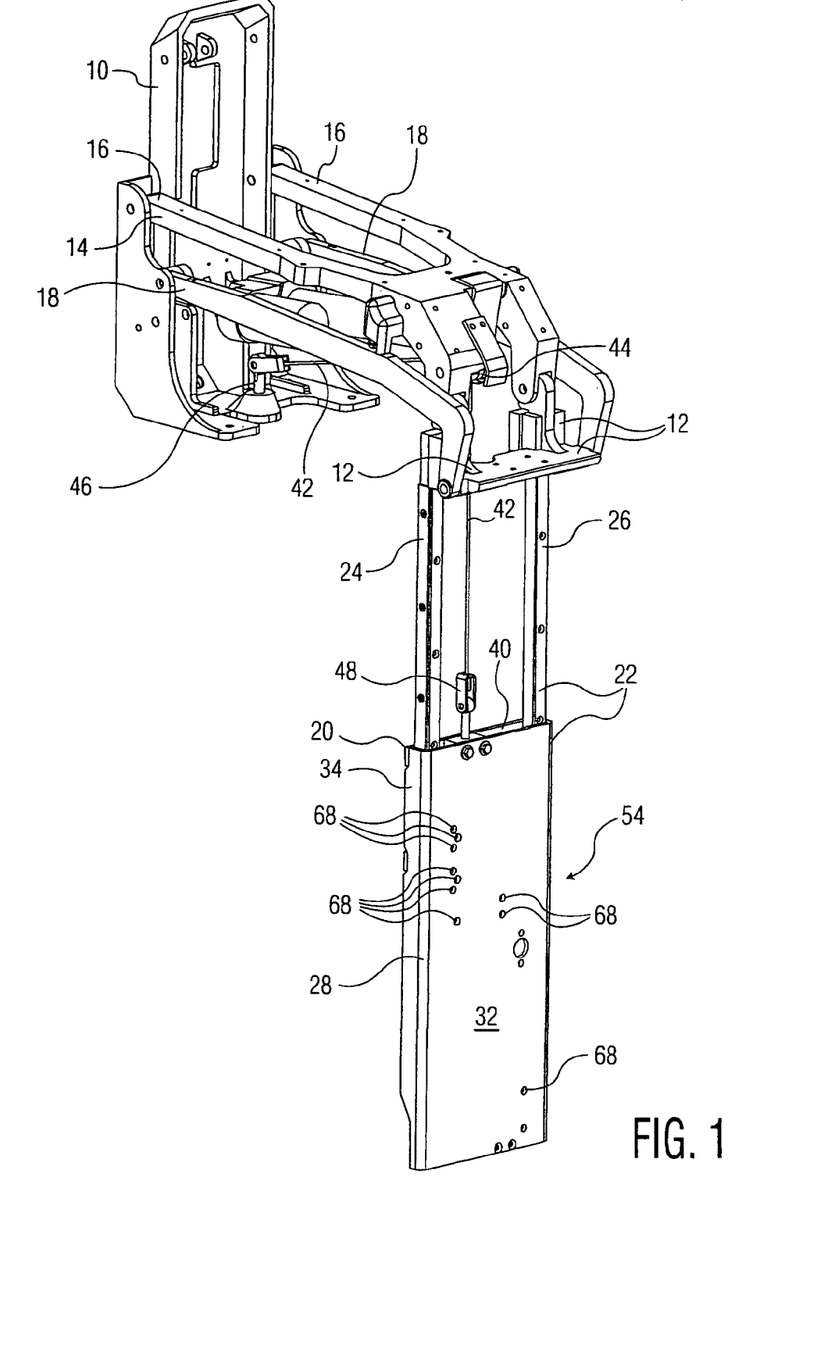
FIG. 1 is a front three-quarter perspective of an embodiment of the remote equipment storage apparatus for use with an emergency vehicle of the present invention shown in the fully deployed position viewed from the front.
Figure 3:
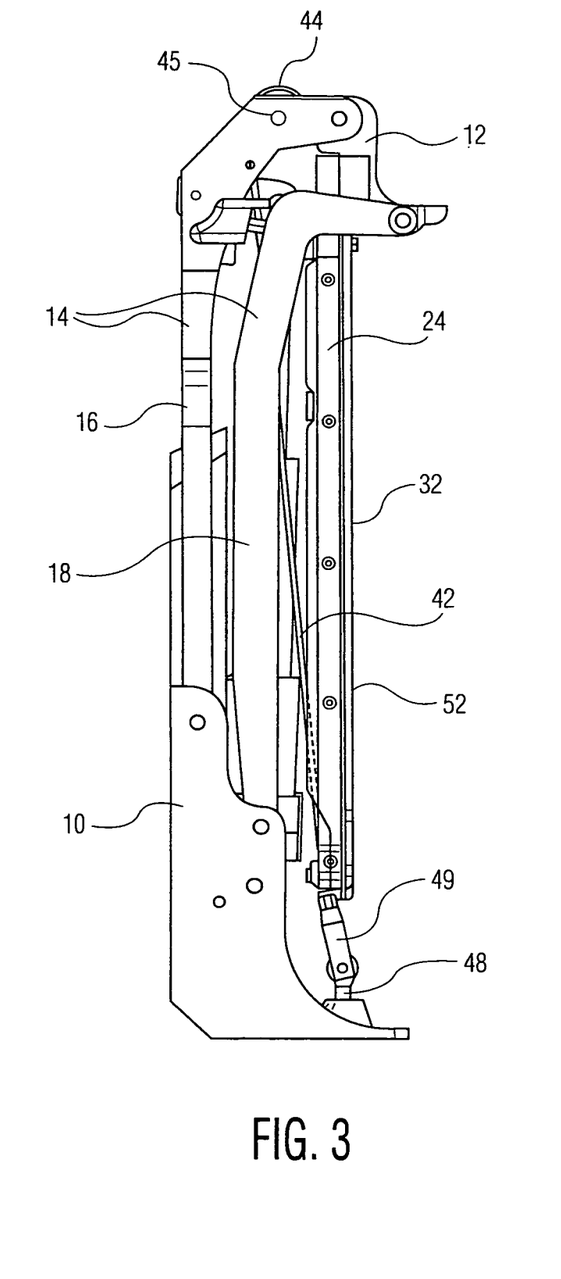
FIG. 3 is a side plan view of the embodiment shown in FIG. 1 with the apparatus shown in the stored position.

The present invention provides a remote equipment storage apparatus including an inner housing 10 and an outer bracket 12 movably connected with respect one another. Inner housing 10 and outer bracket 12 are connected with respect to one another by a parallel arm assembly 14 which allows parallel movement therebetween. The parallel arm assembly 14 includes a first arm member 16 and a second arm member 18. First arm member 16 is movably attached with respect to the inner housing 10 and movably attached with respect to the outer bracket 12. Similarly the second arm member 18 is movably secured with respect to the inner housing 10 and movably secured with respect to the outer bracket 12 at positions spatially disposed from the similar points of connection of the first arm member 16 thereto. This spacing between the points of connection of the first and second arm members 16 and 18 where attached with respect to the inner housing 10 and the spacing therebetween of the points of connection with respect to the outer bracket 12 provides a linkage in parallel. As such, with the inner housing 10 secured with respect to a vehicle or other stationary structure the outer bracket 12 can be secured with respect to a ladder or other emergency equipment to allow movement thereof between the storage position 52 in the uppermost location relative to the vehicle and the deployed position 54 in the lowermost position deployed downwardly along the side of the vehicle. Storage position 52 is best shown in FIG. 3 and deployed position 54 is best shown in FIGS. 1 and 3. This parallel arm assembly 14 allows the outer bracket 12 to be maintained in the same orientation with respect to the inner housing 10 when positioned in the storage position 52 as when positioned, in the deployed position 54 as well as while moving at any location intermediate therebetween.

Powering of movement of the outer bracket 12 relative to the inner housing 10 is achieved by the inclusion of a longitudinally extensible member 56 connected to a drive means 58. The longitudinally extensible member 56 is preferably movably attached through the drive means 58 with respect to the inner housing 10 and also is pivotally attached with respect to the outer bracket 12 to power relative movement therebetween wherein the positioning of this movement is controlled at all times by the parallel arm assembly 14 extending therebetween.

In use, it is preferable that the present invention be utilized in pairs although they could be used singly or in groupings greater than two such as three or four or more. Ladders and other types of emergency equipment tend to be particularly heavy and distribution of the significant weight load is better achieved by the inclusion of two or more similarly configured remote equipment storage apparatus construction placed laterally along the length of a vehicle spatially disposed from one another. Each construction should preferably be securable with respect to one end of the emergency equipment being stored with the other end securable with respect to the vehicle. The structure of each of the remote equipment storage apparatus will be often be identical with respect to one another and movement therebetween will be coordinated to maintain the ladder or other emergency equipment in a horizontal orientation laterally.

The emergency equipment that will be stored such as a ladder, or the like, is attached with respect to the sliding carriage 28. The sliding carriage includes a front panel 30 which includes a front surface 32 of front panel 30 to which a ladder can be attached with any type of a conventional bracket or securement means. This securement means is not shown in the invention but can comprise any combination of brackets, straps, springs or clamps which is mountable directly to the front facing surface 32 of the front panel 30 of sliding carriage 28.

Figure 6:
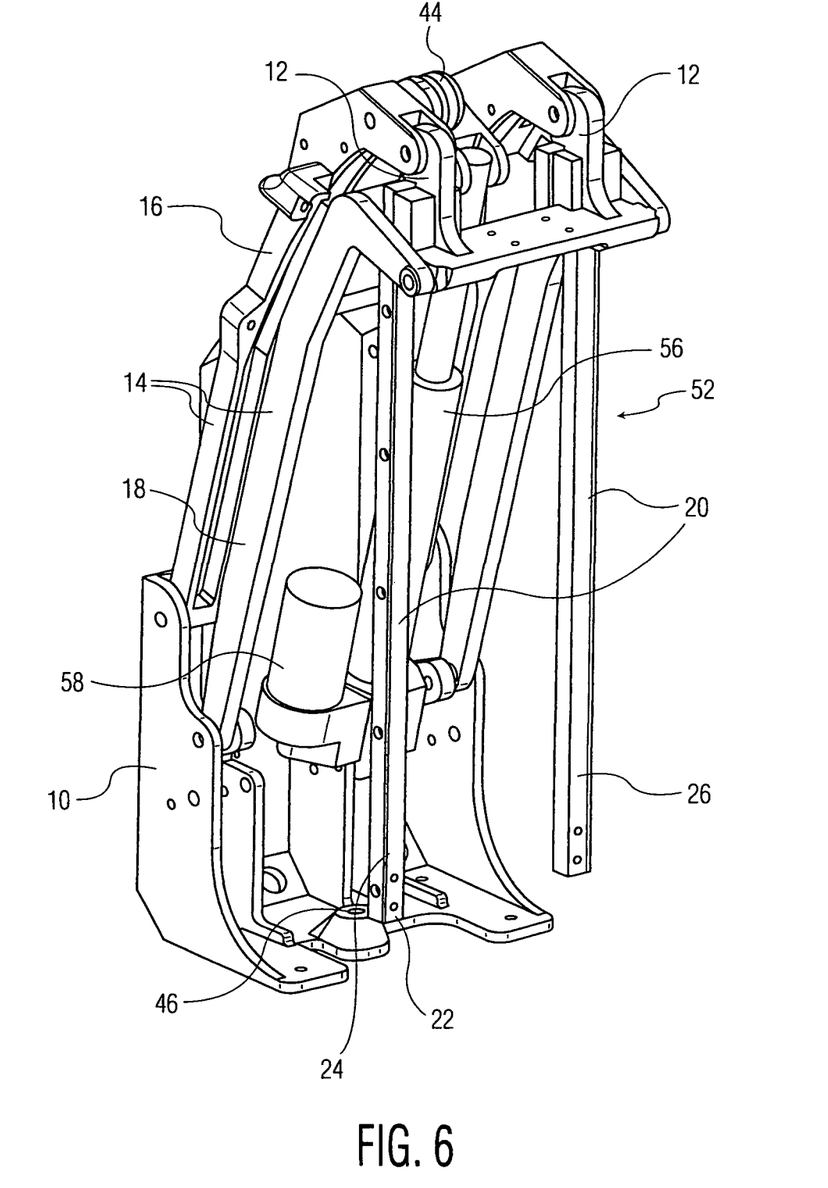
FIG. 6 is an illustration of the embodiment shown in FIG. 5 with the flexible control line and the sliding carriage removed to facilitate visibility of the internal parts thereof.

The equipment holding assembly 20 includes a slide bar mechanism 22 and the sliding carriage 28. The slide bar mechanism 22 includes preferably two slide bar members shown best in FIG. 6 as a first slide bar member 24 and a second slide bar member 26. Each of these slide bar members will be connected at the upper end to the outer bracket 12 and will extend downwardly therefrom at locations spaced apart from one another and, thus, will extend generally downwardly and be oriented extending generally parallel to one another. These first and second slide bars 24 and 28 will comprise the supporting construction for facilitating sliding movement of the sliding carriage 28 with respect to the outer bracket 12.

Figure 4:
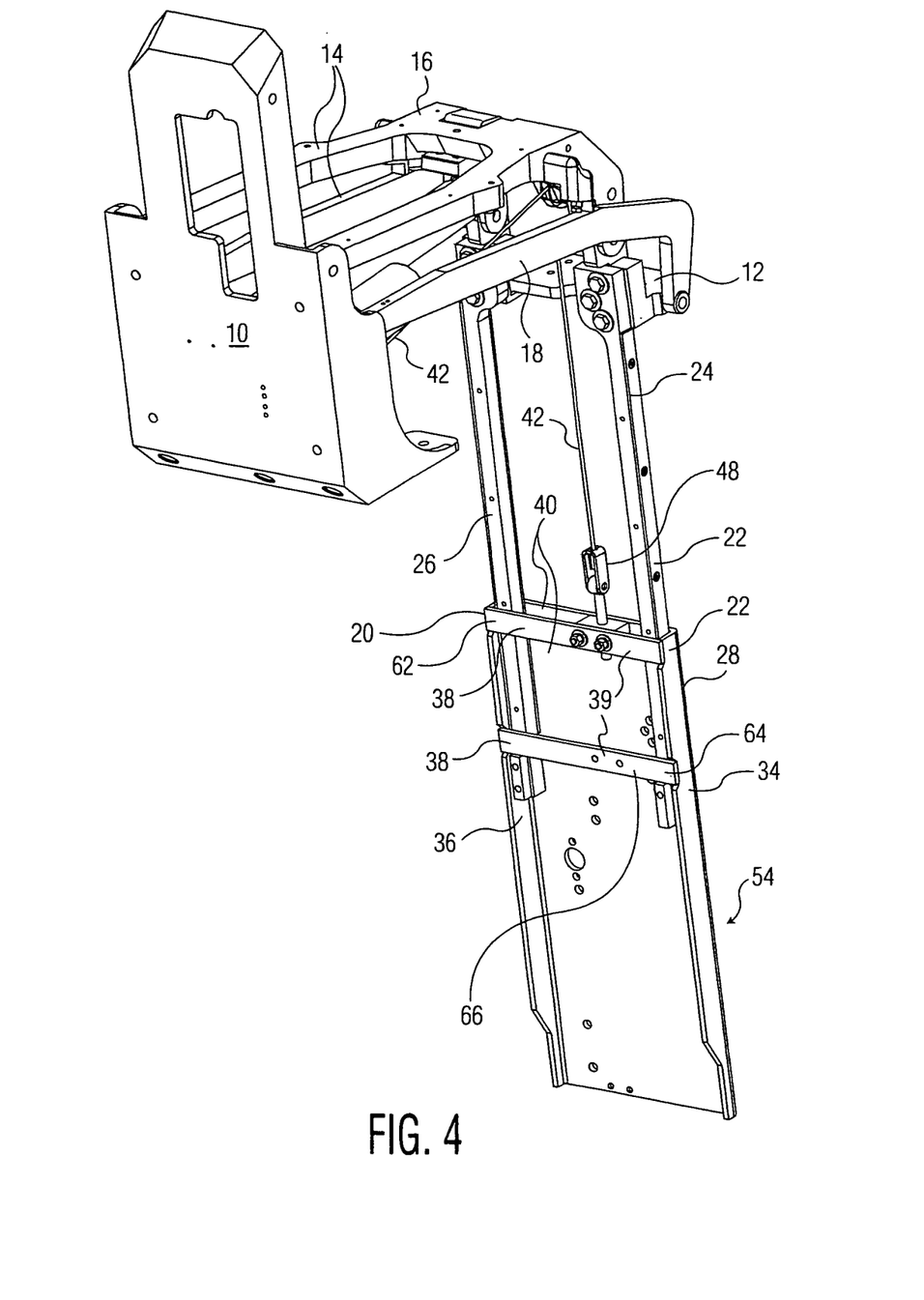
FIG. 4 is a front three-quarter perspective of an embodiment of the remote equipment storage apparatus for use with an emergency vehicle of the present invention shown in the fully deployed position viewed from the back.

The sliding carriage 28 will define a slide chamber 40 therewithin which is adapted to receive the first and second slide bar members 24 and 26 extending vertically therethrough to be slideably movable therewithin. In particular, the sliding carriage 28 will be defined by the front panel 30 and a first side panel 34 and a second side panel 36 extending rearwardly therefrom spatially disposed from each other. Preferably first side panel 34 and second side panel 36 will be generally parallel with respect to one another. In the embodiment shown in FIG. 4 the slide chamber 40 will have an open area 37 thereof opposite from and spatially disposed from the front panel 30. A cross member assembly 39 including one or more rear cross members 38 will extend across this otherwise open area between the first and second side panels 34 and 36 and be fixedly secured with respect to one another at a position spatially disposed rearwardly from the front panel 30 of the sliding carriage 28. In this embodiment, assembly 39 will include a first rear cross member 62 adjacent the upper end of sliding carriage 28 and a second rear cross member 64 therebelow and a third rear cross member 66 below said second rear cross member 64. In this manner, the slide chamber 40 will be defined between the rear surface of the front panel 30 and the rear cross members 62, 64 and 66, extending across the otherwise open area 37, as well as between the inner facing surfaces of the first side panel 34 and the second side panel 36. In this manner the sliding carriage 28 will be capable of vertical movement along the length of the first and second slide bar members 24 and 26 to allow the deployed position 54 to be defined closer to the surrounding environmental floor surface which greatly facilitates access by emergency workers to the equipment stored by attachment with respect to the front surface 32 of the front panel 30 of the sliding carriage 28.

Figure 5:
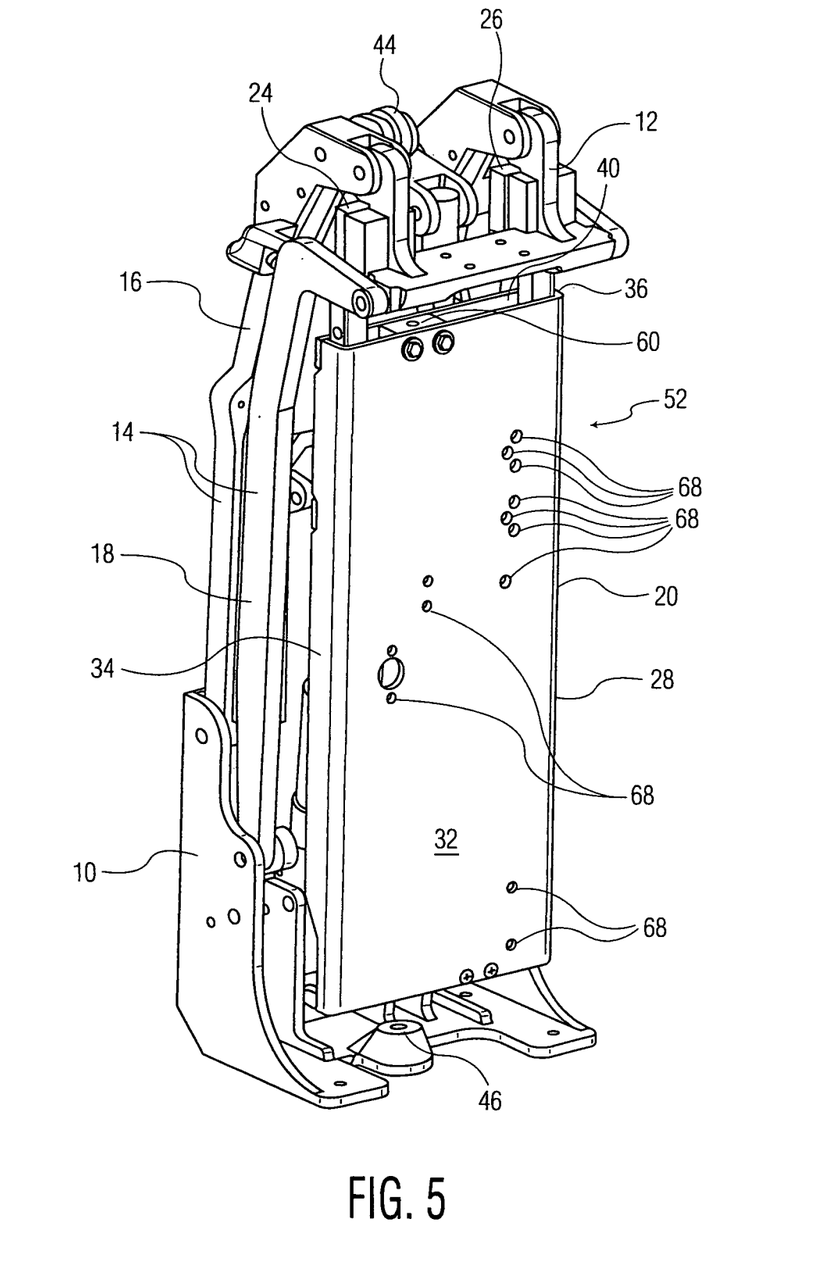
FIG. 5 is a front three-quarter perspective of the apparatus of the present invention shown in the storage position with the flexible control line removed and not shown for the purposes of clarity.

Control of movement of the sliding carriage 28 relative to the outer bracket 12 is achieved by a flexible control line 42. This flexible control line 42 is attached with respect to the inner housing 10 and extends upwardly around a pulley 44 rotatably mounted on the parallel arm assembly 14 and then will extend downwardly into a point of securement with respect to the sliding carriage 28 and, particularly, preferably with respect to the uppermost edge thereof. Preferably, the attachment of the flexible control line will comprises some type of flexible connection with respect to the inner housing 10 as well as with respect to the parallel arm assembly 14 to maintain attachments therewith during movement between the storage position 52 and the deployed position 54. As shown in the figures of the present invention including FIG. 5, preferably an attachment block 60 is positioned between the rear surface of the sliding carriage 28 and the front surface of the uppermost rear cross member 38 to provide a location for flexible securement of the flexible control line 42 with respect to the sliding carriage 28. A lower shelf 70 is preferably secured to the lower end of the inner housing to allow attachment of said flexible control line 42 to be made by flexibly moveable attachment thereof directly to the lower shelf 70 to further facilitate movement of said sliding carriage 28 to the deployed position.

It should be appreciated that the purpose of the flexible control line 42 is to limit the downward movement of the sliding carriage 28 along the first and second slide bar members 24 and 26 which is powered by gravitational force. The weight of the sliding carriage 28 including the front panel 30 and the side panels 34 and 36 and the rear cross member or members 38 as well as the ladder or other emergency equipment attached to the front surface 32 of the front panel 30 is significant and will exert a downwardly directed bias continuously on the sliding carriage 38 and will try to cause it to move downwardly at all times. The only limitation to this downward movement is the flexible control arm 42 which has a limited defined length.

Figure 2:
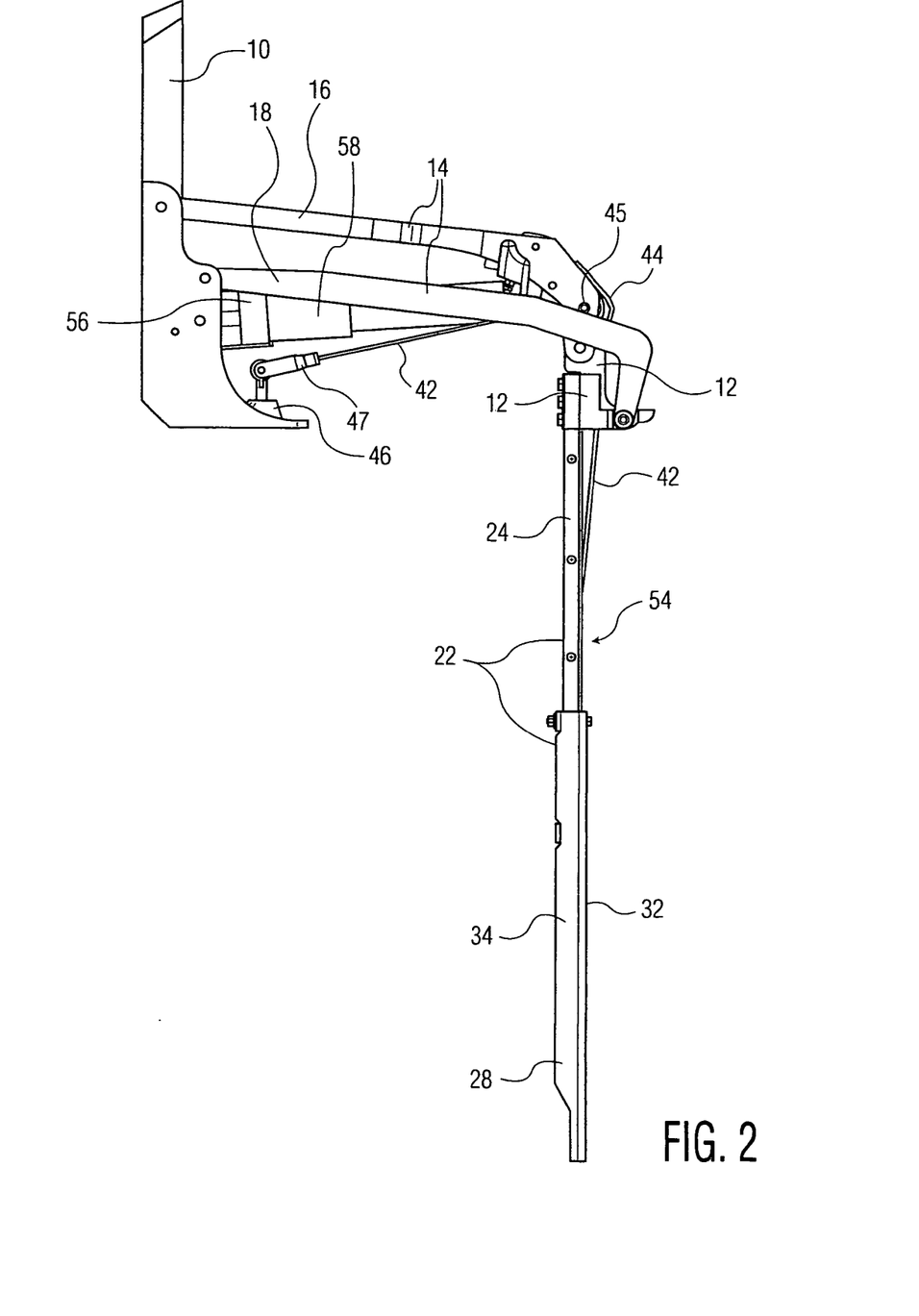
FIG. 2 is a side plan view of the embodiment shown in FIG. 1.

As shown best in FIG. 2 it is important to appreciate that the point of attachment of the flexible control arm 42 relative to the inner housing 10 is at a position located closer to the ladder holding assembly 20 than the points of pivotal connection of the first and second arm members 16 and 18 relative to the inner housing 10. Also it should be noted that the position of the pulley 44 is chosen with the pulley axis 45 thereof extending horizontally and at a position such that the pulley 44 is attached to the downwardly movable outer bracket 12.

Thus, it is very important to appreciate that the distance between the inner attachment means 46 where the flexible control line 42 is movably attached with respect to the inner housing 10 and the pulley 44 is greatest when the apparatus of the present invention is in the storage position 52. However, as the apparatus moves from storage position 52 toward the deployed position 54, the distance between the inner attachment means 46 and the pulley 44 will decrease thereby providing a significant amount of slack in the longitudinal length of the flexible control line 42 thereby allowing it to further extend around the pulley which will provide an added length in the portion of the flexible control line 42 between the pulley and the outer attachment means 48 where it attaches, preferably flexibly with respect to the sliding carriage 28. This geometry will thereby will allow the sliding carriage 28 to move downwardly relative to and along the first and second slide bar members 24 and 26 which will allow further downward movement with it of a ladder or other emergency equipment attached to the front surface 32 of the front panel 30 thereof.

When the remote equipment storage apparatus of the present invention moves from the deployed position 54 toward the storage position 52 all parts will operate in the reverse direction and the spacing between the inner attachment means 46 and the pulley 44 will increase thereby causing the sliding carriage 28 to move upwardly along the first and second slide bar members 24 and 26 as the apparatus moves upwardly toward the storage position 52. It should be appreciated that the length of the flexible control line 42 can be varied as desired for each given application which will have the effect of varying the relative position between the sliding carriage 28 and the slide bar mechanism 22 at both the deployed position 54 and at the storage position 52. For example, lengthening this cable will have the effect of positioning the sliding carriage 28 at a lower position relative to the first and second slide bar members 24 and 26 at the deployed position 54 to facilitate more convenient access thereto. Control or varying of the length of the flexible control line 42 therefore is an important adjustable operational characteristic made possible by the unique construction of the present invention.

Operation of the present invention is further enhanced by the inclusion of a first pivoting link 47 pivotally secured with respect to the inner attachment means 46 and secured with respect to the upper end of the flexible control line 42. This flexibility added by the first pivoting link 47 enhances the flexibly therebetween and enhances the downwardly extended movement of the sliding carriage 28 relative to the outer bracket 12. Also a second pivoting link 50 can be positioned attached to the upper end of the sliding carriage 28 and also be attached with respect to the lowermost end of the flexible control line 42. This flexible link will aid in controlling of vertical movement as limited by the flexible control line 42 between the sliding carriage 28 and the outer bracket 12.

As such, the present invention provides a unique means for deploying emergency equipment such as ladders or the like at a much lower position than conventionally possible using fixed linkage. This capability is enhanced without requiring any additional powering equipment since the additional power for the additional downward movement of the sliding carriage 28 relative to the outer bracket 12 is achieved merely by harnessing the gravitational forces exerted on the sliding bar mechanism 22.

It should further be particularly appreciated that the geometry of positioning of the inner attachment means 46 and the outer attachment means 48 and the pulley 44 and pulley axis 45 thereof are important considerations in controlling the movement of the sliding carriage 28 relative to the slide bar mechanism 22. The change in the distance between the pulley 44 and the inner attachment means 46 is primarily achieved by the positioning of the inner attachment means 46 spatially disposed outwardly from the locations of pivotal connection of the parallel arm assembly 14 with respect to the inner housing 10. Positioning of this inner attachment means 46 inwardly and below the axis of pivotal securement of the parallel assembly 14 with respect to the inner housing 10 achieves this desired geometry and allows the force of gravity to be exerted on the sliding carriage 28 to provide extended downward movement of the emergency apparatus to facilitate retrieval therefrom at lower deployed position 54 than otherwise possible.

Front panel 30 will preferably include a plurality of mounting apertures 68 defined therein and extending into and through said front surface 32 thereof to facilitate mounting of emergency equipment such as ladders and the like with respect thereto using conventional brackets or by direct attachment preferably using conventional securement means.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. A remote equipment storage apparatus with a downwardly extendable retrieval position particularly usable for storing equipment on an emergency vehicle comprising:
   A. an inner housing mounted to an emergency vehicle;
   B. a parallel arm assembly pivotally moveably attached to said inner housing and moveable between a storage position thereadjacent and a deployed position extending outwardly therefrom to a position spatially disposed from said inner housing;
   C. an outer bracket pivotally moveably attached to said parallel arm assembly at a position spatially disposed from said inner housing, said outer bracket being moveable along with said parallel arm assembly between a storage position adjacent said inner housing and a deployed position spatially disposed therefrom;
   D. a first slide bar member secured to said outer bracket and extending outwardly therefrom;
   E. a second slide bar member secured to said outer bracket and extending outwardly therefrom at a position spatially disposed from said first slide bar member;

F. a sliding carriage moveably engaged with respect to said first slide bar member and said second slide bar member, said sliding carriage comprising;
   (1) a front panel adapted to receive equipment attached with respect thereto to facilitate movement thereof between the storage position and the deployed position;
   (2) a first side panel extending outwardly from said front panel;
   (3) a second side panel extending outwardly from said front panel at a position spatially disposed from said first side panel, said front panel and said first side panel and said second side panel defining therebetween a slide chamber adapted to receive said first slide bar member and said second slide bar member slideably moveably retained therewithin to facilitate vertical movement of said sliding carriage along said first and second slide bar members during movement to and from a deployed position therebelow to facilitate access to equipment attached to said front panel of said sliding carriage;
      a. a longitudinally extensible member attached to said inner housing and to said parallel arm assembly to power movement thereof between the storage position and the deployed position; and
H. a flexible control line attached to said inner housing and extending through said parallel arm assembly and attached to said sliding carriage to limit downward movement thereof to the deployed position.

2. A remote equipment storage apparatus with a downwardly extendable retrieval position particularly usable for storing equipment on an emergency vehicle as defined in claim 1 further comprising a pulley rotatably mounted with respect to said parallel arm assembly, said flexible control line being positioned extending around said pulley to enhance freedom of movement of said flexible control line with respect to said parallel arm assembly to facilitate movement of said sliding carriage to and from the deployed position.

3. A remote equipment storage apparatus with a downwardly extendable retrieval position particularly usable for storing equipment on an emergency vehicle as defined in claim 1 wherein said first side panel and said second side panel are oriented extending parallel with respect to one another.

4. A remote equipment storage apparatus with a downwardly extendable retrieval position particularly usable for storing equipment on an emergency vehicle as defined in claim 1 wherein said sliding carriage further includes a rear cross member assembly comprising at least one rear cross member attached to said first side panel and said second side panel at a position thereon spatially disposed from said front panel, said rear cross member assembly along with said front panel defining said slide chamber therebetween.

5. A remote equipment storage apparatus with a downwardly extendable retrieval position particularly usable for storing equipment on an emergency vehicle as defined in claim 4 wherein said rear cross member assembly comprises:
   A. a first rear cross member attached to said first side panel and said second side panel at a position thereon spatially disposed from said front panel;
   B. a second rear cross member attached to said first side panel and said second side panel at a position thereon spatially disposed from said front panel and spatially disposed below said first rear cross member;
   C. a third rear cross member attached to said first side panel and said second side panel at a position thereon spatially disposed from said front panel and spatially disposed below said second rear cross member.

6. A remote equipment storage apparatus with a downwardly extendable retrieval position particularly usable for storing equipment on an emergency vehicle as defined in claim 5 wherein said slide chamber is defined between said first, second and third cross members and said front panel and wherein said first, second and third cross members extending parallel with respect to one another and parallel with respect to said front panel.

7. A remote equipment storage apparatus with a downwardly extendable retrieval position particularly usable for storing equipment on an emergency vehicle as defined in claim 6 wherein said sliding carriage includes an attachment block secured between said first rear cross member and said front panel, said flexible control line being attached directly to said attachment block to provide attachment thereof to said sliding carriage.

8. A remote equipment storage apparatus with a downwardly extendable retrieval position particularly usable for storing equipment on an emergency vehicle as defined in claim 1 wherein said sliding carriage moves along said first slide bar member and said second slide bar member to a position spatially disposed distant from said outer bracket responsive to said parallel arm assembly moving to the deployed position thereof.

9. A remote equipment storage apparatus with a downwardly extendable retrieval position particularly usable for storing equipment on an emergency vehicle as defined in claim 1 wherein said parallel arm assembly maintains said outer bracket and said first slide bar member and said second slide bar member and said sliding carriage oriented vertically at said storage position and at said deployed position and always during movement therebetween.

10. A remote equipment storage apparatus with a downwardly extendable retrieval position particularly usable for storing equipment on an emergency vehicle as defined in claim 1 wherein said flexible control line is pivotally moveably attached to said inner housing and is pivotally moveable attached with respect to said sliding carriage.

11. A remote equipment storage apparatus with a downwardly extendable retrieval position particularly usable for storing equipment on an emergency vehicle as defined in claim 1 wherein said sliding carriage is moveably positioned with respect to said first slide bar member with said first slide bar member extending into said slide chamber to a position adjacent said first side panel and wherein said sliding carriage is moveably positioned with respect to said second slide bar member with said second slide bar member extending into said slide chamber to a position adjacent said second side panel.

12. A remote equipment storage apparatus with a downwardly extendable retrieval position particularly usable for storing equipment on an emergency vehicle as defined in claim 1 wherein said slide chamber has a generally rectangular cross sectional shape and wherein said first slide bar member and said second slide bar member are each generally rectangular in cross sectional shape.

13. A remote equipment storage apparatus with a downwardly extendable retrieval position particularly usable for storing equipment on an emergency vehicle as defined in claim 1 wherein said front panel defines a plurality of mounting apertures therein to facilitate securement of equipment with respect thereto.

14. A remote equipment storage apparatus with a downwardly extendable retrieval position particularly usable for storing equipment on an emergency vehicle as defined in claim 1 wherein said flexible control line is attached to said inner housing at a position thereon spatially disposed from the emergency vehicle to which it is mounted to facilitate downward movement of said sliding carriage to the deployed position.

15. A remote equipment storage apparatus with a downwardly extendable retrieval position particularly usable for storing equipment on an emergency vehicle as defined in claim 1 further comprising a lower shelf mounted to said inner housing and extending inwardly therefrom toward said sliding carriage and wherein said flexible control line is attached with respect to said lower shelf thereof to facilitate full movement of said sliding carriage to the deployed position.

16. A remote equipment storage apparatus with a downwardly extendable retrieval position particularly usable for storing equipment on an emergency vehicle as defined in claim 1 further comprising a drive means operatively attached to said longitudinally extensible member to facilitate extension and retraction thereof to power movement of said sliding carriage between the storage position and the deployed position thereof, respectively.

17. A remote equipment storage apparatus with a downwardly extendable retrieval position particularly usable for storing equipment on an emergency vehicle as defined in claim 1 wherein said sliding carriage is responsive to retraction of said longitudinally extensible member to move to the storage position.

18. A remote equipment storage apparatus with a downwardly extendable retrieval position particularly usable for storing equipment on an emergency vehicle as defined in claim 1 wherein said sliding carriage is responsive to extension of said longitudinally extensible member to move to the deployed position.

19. A remote equipment storage apparatus with a downwardly extendable retrieval position particularly usable for storing equipment on an emergency vehicle comprising:
  A. an inner housing mounted to an emergency vehicle;
  B. a parallel arm assembly pivotally moveably attached to said inner housing and moveable between a storage position thereadjacent and a deployed position extending outwardly therefrom to a position spatially disposed from said inner housing, said parallel arm assembly including a pulley rotatable movement with respect thereto;
  C. an outer bracket pivotally moveably attached to said parallel arm assembly at a position spatially disposed from said inner housing, said outer bracket being moveable along with said parallel arm assembly between a storage position adjacent said inner housing and a deployed position spatially disposed therefrom;
  D. a first slide bar member secured to said outer bracket and extending downwardly therefrom;
  E. a second slide bar member secured to said outer bracket and extending downwardly therefrom at a position spatially disposed from said first slide bar member;
  F. a sliding carriage moveably engaged with respect to said first slide bar member and said second slide bar member, said sliding carriage moveable along said first slide bar member and said second slide bar member to a position spatially disposed distant from said outer bracket responsive to said parallel arm assembly moving to the deployed position thereof, said parallel arm assembly operative to maintain said outer bracket and said first slide bar member and said second slide bar member and said sliding carriage oriented vertically at said storage position and at said deployed position and always during movement therebetween, said sliding carriage comprising;
    (1) a front panel adapted to receive equipment attached with respect thereto to facilitate movement thereof between the storage position and the deployed position;
    (2) a first side panel extending outwardly from said front panel;
    (3) a second side panel extending outwardly from said front panel at a position spatially disposed from said first side panel, said front panel and said first side panel and said second side panel defining therebetween a slide chamber adapted to receive said first slide bar member and said second slide bar member slideably moveably retained therewithin to facilitate vertical movement of said sliding carriage along said first and second slide bar members during movement to and from a deployed position therebelow to facilitate access to equipment attached to said front panel of said sliding carriage;
  G. a longitudinally extensible member attached to said inner housing and to said parallel arm assembly to power movement thereof between the storage position and the deployed position; and
  H. a flexible control line attached to said inner housing and through said parallel arm assembly extending around said pulley and attached to said sliding carriage to limit downward movement thereof to the deployed position, said flexible control line being pivotally moveably attached to said inner housing and being pivotally moveable attached with respect to said sliding carriage.

20. A remote equipment storage apparatus with a downwardly extendable retrieval position particularly usable for storing equipment on an emergency vehicle comprising:
  A. an inner housing mounted to an emergency vehicle;
  B. a parallel arm assembly pivotally moveably attached to said inner housing and moveable between a storage position thereadjacent and a deployed position extending outwardly therefrom to a position spatially disposed from said inner housing, said parallel arm assembly including a pulley rotatable movement with respect thereto;
  C. an outer bracket pivotally moveably attached to said parallel arm assembly at a position spatially disposed from said inner housing, said outer bracket being moveable along with said parallel arm assembly between a storage position adjacent said inner housing and a deployed position spatially disposed therefrom;
  D. a first slide bar member secured to said outer bracket and extending downwardly therefrom;
  E. a second slide bar member secured to said outer bracket and extending downwardly therefrom at a position spatially disposed from said first slide bar member;
  F. a sliding carriage moveably engaged with respect to said first slide bar member and said second slide bar member, said sliding carriage moveable along said first slide bar member and said second slide bar member to a position spatially disposed distant from said outer bracket responsive to said parallel arm assembly moving to the deployed position thereof, said parallel arm assembly operative to maintain said outer bracket and said first slide bar member and said second slide bar member and said sliding carriage oriented vertically at said storage position and at said deployed position and always during movement therebetween, said sliding carriage comprising;

(1) a front panel adapted to receive equipment attached with respect thereto to facilitate movement thereof between the storage position and the deployed position;
(2) a first side panel extending outwardly from said front panel;
(3) a second side panel extending outwardly from said front panel at a position spatially disposed from said first side panel, said front panel and said first side panel and said second side panel defining therebetween a slide chamber adapted to receive said first slide bar member and said second slide bar member slideably moveably retained therewithin to facilitate vertical movement of said sliding carriage along said first and second slide bar members during movement to and from a deployed position therebelow to facilitate access to equipment attached to said front panel of said sliding carriage, said first side panel and said second side panel being oriented extending parallel with respect to one another;
(4) a rear cross member assembly comprising at least one rear cross member attached to said first side panel and said second side panel at a position thereon spatially disposed from said front panel, said rear cross member assembly along with said front panel defining said slide chamber therebetween, wherein said rear cross member assembly comprises:

(a) a first rear cross member attached to said first side panel and said second side panel at a position thereon spatially disposed from said front panel;
  (b) a second rear cross member attached to said first side panel and said second side panel at a position thereon spatially disposed from said front panel and spatially disposed below said first rear cross member;
  (c) a third rear cross member attached to said first side panel and said second side panel at a position thereon spatially disposed from said front panel and spatially disposed below said second rear cross member;

G. a longitudinally extensible member attached to said inner housing and to said parallel arm assembly to power movement thereof between the storage position and the deployed position; and
H. a flexible control line attached to said inner housing and through said parallel arm assembly extending around said pulley and attached to said sliding carriage to limit downward movement thereof to the deployed position, said flexible control line being pivotally moveably attached to said inner housing and being pivotally moveable attached with respect to said sliding carriage.

\* \* \* \* \*